May 12, 1936.  C. T. ROTTLER  2,040,273
PORTABLE BORING MACHINE AND BORING BAR THEREFOR
Filed Nov. 22, 1932   5 Sheets-Sheet 2
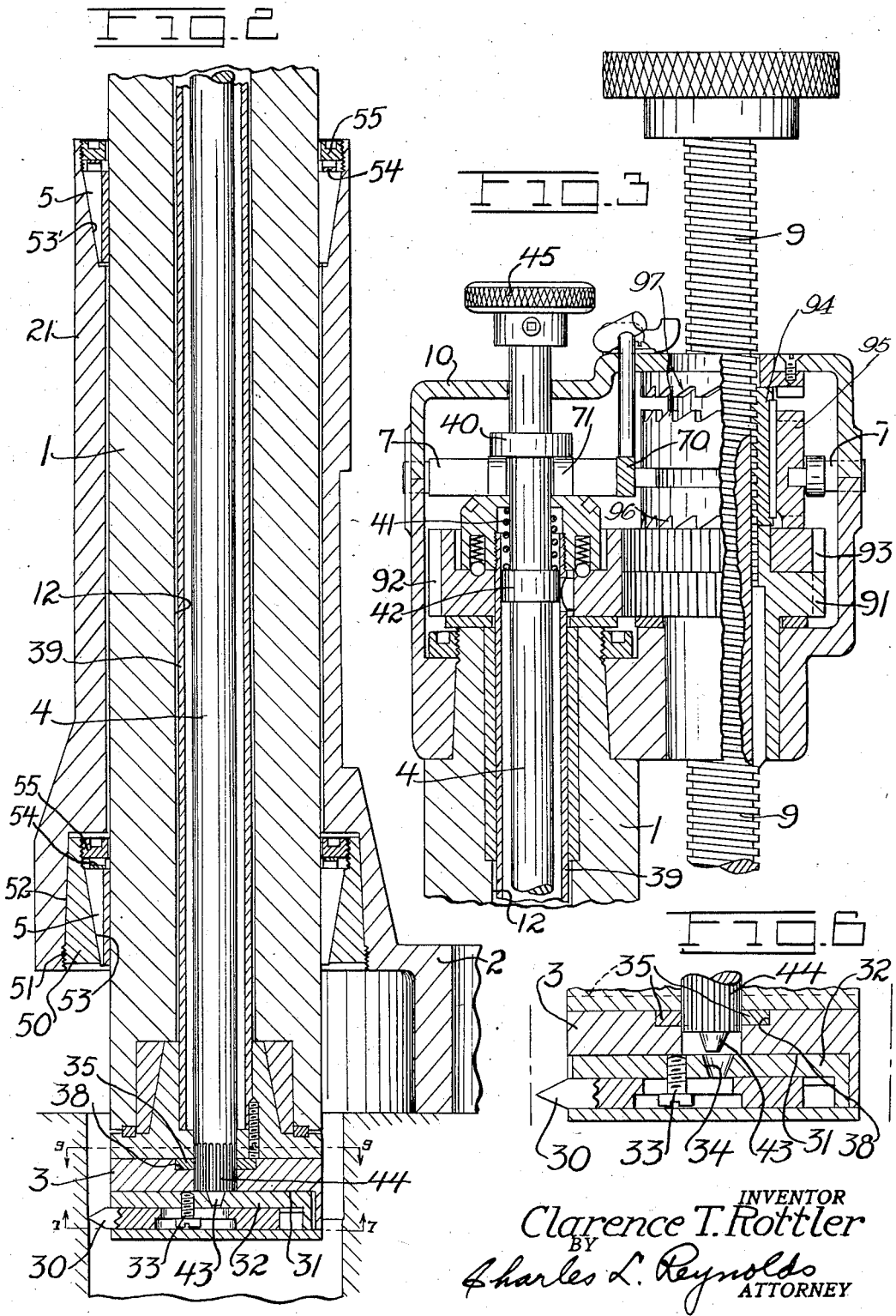
INVENTOR
Clarence T. Rottler
BY
Charles L. Reynolds
ATTORNEY May 12, 1936.  C. T. ROTTLER  2,040,273
PORTABLE BORING MACHINE AND BORING BAR THEREFOR
Filed Nov. 22, 1932   5 Sheets-Sheet 3
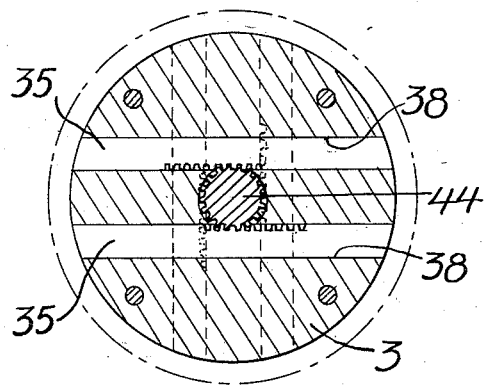
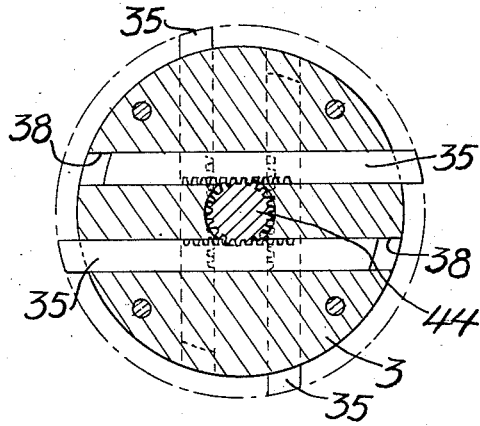
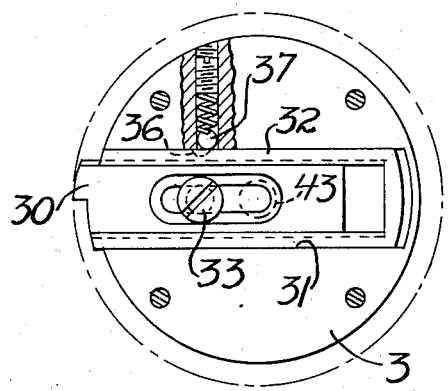
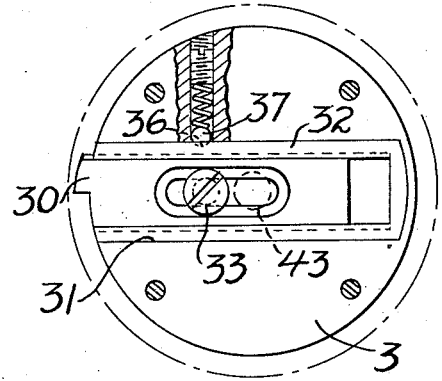
INVENTOR
Clarence T. Rottler
BY
Charles L. Reynolds
ATTORNEY

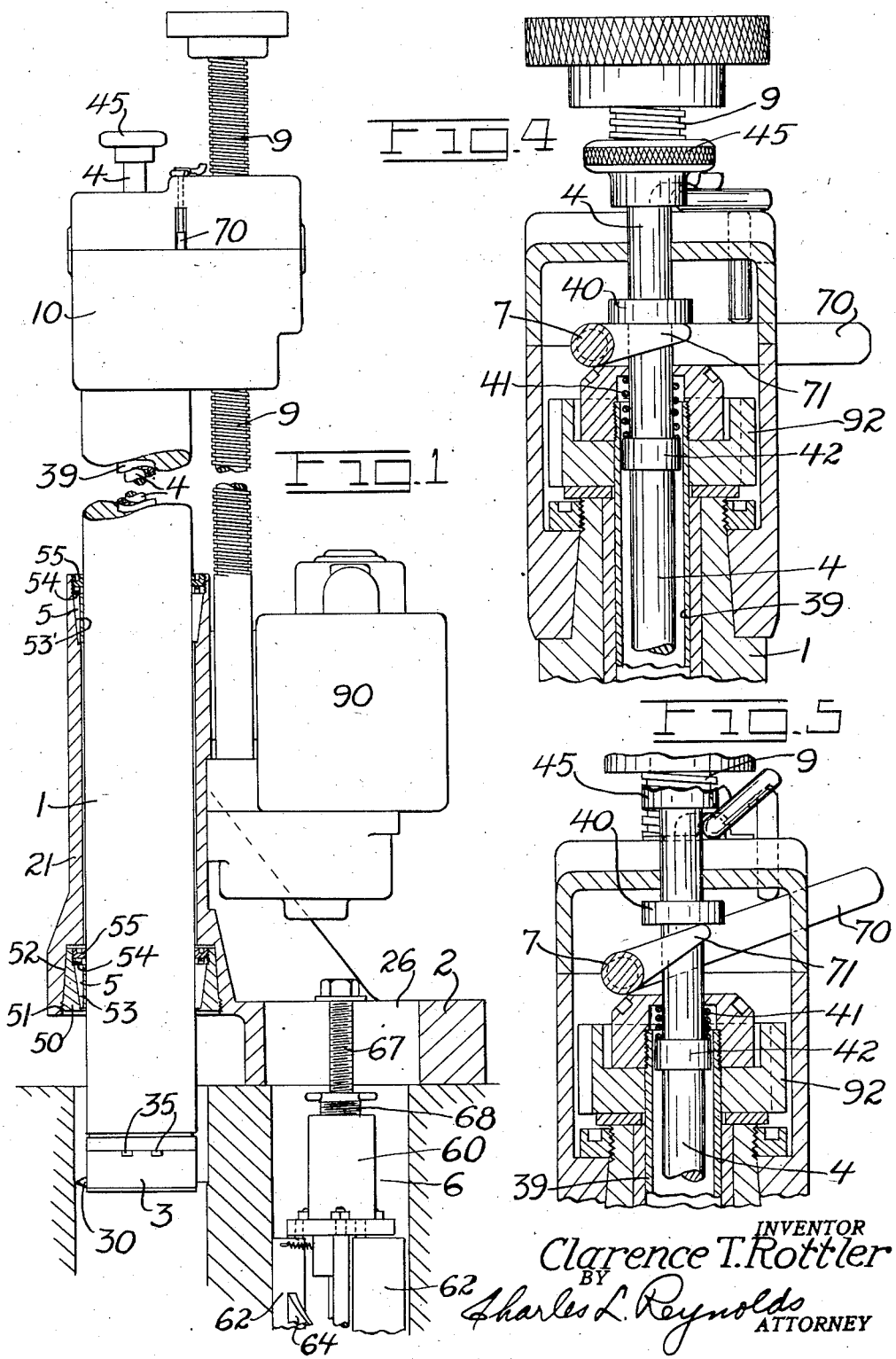

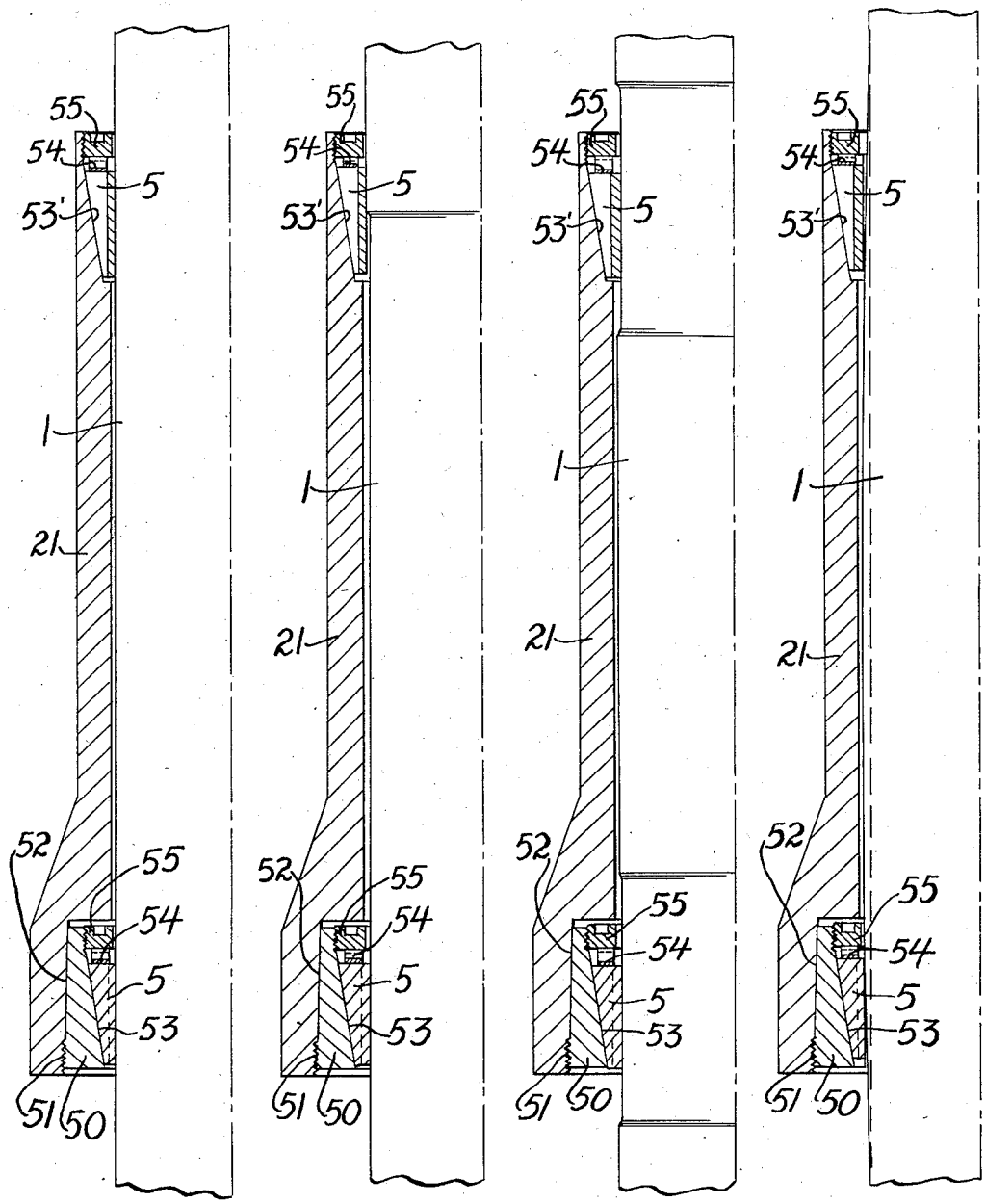

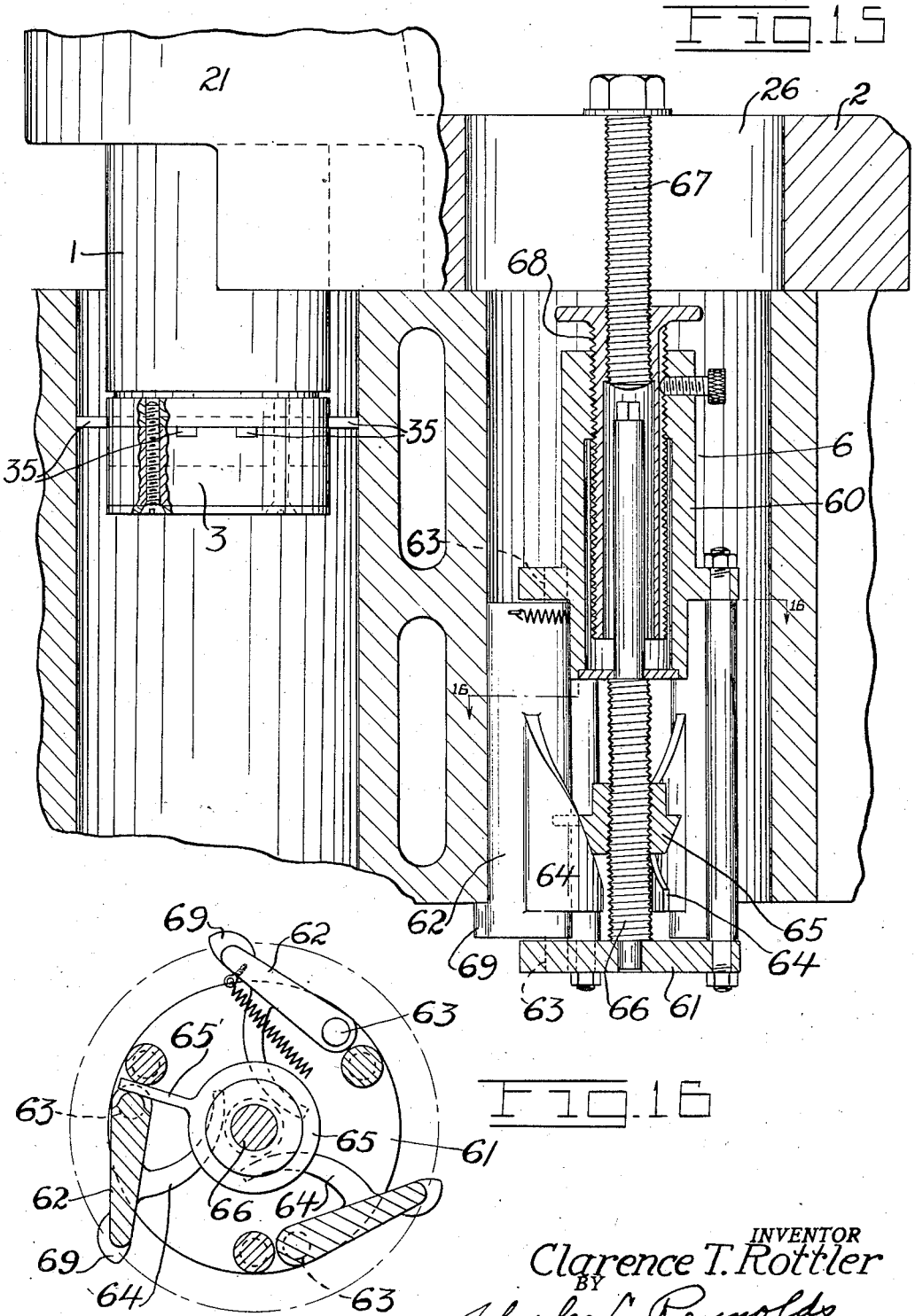

Patented May 12, 1936

2,040,273

UNITED STATES PATENT OFFICE 2,040,273

PORTABLE BORING MACHINE AND BORING BAR THEREFOR

Clarence T. Rottler, Seattle, Wash.

Application November 22, 1932, Serial No. 643,860

15 Claims. (Cl. 77—2)

This invention relates to boring bars—that is, machines for boring or reboring the walls of engine cylinders—and the present application is particularly directed to the means to support and guide the boring bar and the cutting tool, and to the means for centering and controlling the boring bar and tool. One companion application is directed to the means for driving the rotary cutting tool, and for controlling axial movement of the boring bar, and another to the hold-down means whereby the machine is clamped upon the cylinder block.

My boring bar is of the type which in itself is vertically movable, but which is not rotatable. Accordingly, it is necessary to provide a bracket and guide means interengageable between the bracket and the boring bar, whereby the boring bar may be guided accurately and truly, even though, when near the bottom of a cylinder of, let us say, six inches in length, it will project considerably beyond the supporting bracket, and at this distance it must support a rotary cutting tool which must not deviate from a true path, nor vibrate or chatter. The cutting tool, particularly when it is supported at such a distance, has a tendency to vibrate or chatter, and while the boring bar may be made strong and rigid, this avails nothing unless the bearing support between the bar and the bracket is such as to prevent chattering, and to maintain the boring bar for all projections thereof, and in all positions of the cutting tool, exactly and precisely without axial deviation from the original position. However, the bearing must not be so tight as to impede advance unduly, for that in turn may induce chatter, nor must it be anything but free to retroactive movement. In this manner only can the reboring of the cylinder be accurate from end to end of the cylinder. By making it thus accurate with the cutting tool, however, the complete refinishing job can be accomplished by one passage of the cutting tool.

If we assume that the boring bar is accurately made and therefore exactly cylindrical at the outset, wear occurs from time to time, but notwithstanding this the boring bar must be maintained in true axial alignment with its original position, and the bearings supporting the boring bar from the bracket on the base frame must be such as will not only maintain it rigidly in alignment when the bar and bearings are true, but will accommodate themselves to unevenly worn surfaces, and under such circumstances will keep the bar rigid and properly aligned. They must also be such as will accommodate themselves to those inaccuracies impossible to eliminate in the course of original manufacture of the boring bar, so that the boring bar from the outset will be accurate notwithstanding unavoidable inaccuracies either in its construction, or arising from wear.

It is an important object of my invention, therefore, to devise a boring bar having the advantages pointed out above and capable of accomplishing the objects described.

It is also an object of my invention to provide a boring bar having a retractable and projectable cutting tool, and to provide means whereby the cutting tool will be automatically retracted upon upward movement of the boring bar, after completion of a cut, thus to avoid contact of the tool with the cylinder wall, and which will be automatically projected when the boring bar again starts to feed downward.

It is also an object to provide, in connection with a boring bar and rotary cutting tool of the character indicated, a centering means whereby the boring bar can be accurately centered with respect to the axis of the cylinder to be bored, these centering means being associated with the cutting tool in such a way that the cutting tool, when the boring bar has been thus accurately centered, will take a substantially even cut from all the walls of the cylinder, thus to reduce the amount of cutting to a minimum, and to avoid shifting of the final axis of the cylinder.

It is a further object to devise simple, convenient, and compact control means for use in connection with the retractable cutting tool and the projectable centering means, as indicated above.

Other objects, and more especially such as pertain to the mechanical details of the invention, will be ascertained from a study of the attached drawings, of this specification, and of the claims which terminate the same.

In the accompanying drawings I have shown my invention embodied in a form which is now preferred by me.

Figure 1 is a general side elevation of the boring bar, the base frame and the cylinder block being shown in section.

Figure 2 is an axial section through the lower portion of the boring bar and cutting tool, and Figure 3 is a similar section of the upper portion thereof, and of the means for driving the cutter head and the boring bar.

Figure 4 is an axial section through the upper end of the boring bar, taken at right angles to Figure 3, and Figure 5 is a similar section showing parts in a different operative position.

Figure 6 is an axial section of the lower end of the boring bar and cutter head, showing parts in a different position from that shown in Figure 2.

Figure 7 is a section on line 7—7 of Figure 2, and Figure 8 is a similar section, showing the cutting tool in retracted position.

Figures 9 and 10 are sections on the line 9—9 of Figure 2, showing the centering means in the retracted and in the projected positions, respectively.

Figures 11, 12, 13 and 14 are exaggerated diagrammatic illustrations, showing the bearing support for the boring bar in section, and illustrating different contingencies which the bearing support will accommodate.

Figure 15 is an axial section through the boring bar positioning means, shown in conjunction with a cylinder block, and Figure 16 is a cross section thereof on the line 16—16 of Figure 15.

The drive means for the rotary tool and boring bar are fully disclosed in my companion application first referred to above, but in order that the present invention may be clearly understood, I shall explain first how the movement of the boring bar and the rotary tool are effected. The boring bar 1, it will be understood, is supported in a guide bracket 21 of the base frame 2, and at the lower end of the boring bar there is supported a rotary tool or cutter head 3 carrying a cutting tool 30. At its upper end the boring bar carries a casing 10, which in effect is part of the boring bar, and within this casing are means to advance the boring bar slowly downward, to move it rapidly upward, and to cause rotation of the cutter head 3. All such means, in the embodiment shown, are driven primarily from a rotating screw 9 journaled in the base frame 2 or on a member supported therefrom, and driven from the motor 90. The particular drive means forms no part of the present invention, but in the present form comprises a drive gear 91, keyed to rotate with the screw 9, a driven gear 92 meshing with the drive gear 91 and itself keyed to a tube 39 which extends through an axial bore 12 in the boring bar 1 to support and rotate the cutter head 3. In mesh with the driven gear 92 is a differential gear 93 which has slightly fewer teeth than the gear 91, so that it is rotated at a slightly greater peripheral speed than the latter. Likewise coaxial with the gears 91 and 93, and threaded upon the screw 9, is a nut 94, which nut is engageable through the sleeve 95 (slidable relative to the nut but rotatable therewith) either to the differential gear 93 or to the casing 10. For this purpose the differential gear 93 and the sleeve 95 may be provided with complemental clutch teeth 96, and similar clutch teeth 97 are engageable between the sleeve 95 and the casing 10, as may be seen in Figure 3. To control engagement of these clutch members a yoke 7 may be provided, engageable with the sleeve 95, and controllable by a handle 70 which projects through a suitable slot in the casing 10. Fingers 71 are likewise formed upon this yoke for a purpose which will appear hereafter. The yoke is mounted for oscillation in the casing 10.

With the arrangement just described, rotation of the left-handed screw 9 will effect direct rotation of the cutter head 3 by reason of the engagement of the gears 91 and 92, and in addition, through the added gear 93 and the engagement of the clutch at 96, the nut 94 will be given a slightly different rate of rotation than the screw, effecting feed of the screw within the nut, and consequently effecting downward movement of the boring bar. Upon engagement of the clutch members 97, however, the nut is held stationary relative to the boring bar, and since the screw 9 continues to rotate, the boring bar will be raised rapidly.

The rotary cutter head 3 is formed with a substantially radial guideway 31 in which is received the tool 30, which tool, however, is preferably removably supported in and adjustable relative to a tool carrier 32, the adjustment being accomplished, when the tool has been removed from the cutter head, by the bolt and slot connection at 33. Except as such adjustment is desirable the tool carrier could be omitted, and it is, for all other purposes, the equivalent of the tool itself. The tool carrier has a tapered hole or surface 34 for a purpose which will appear hereafter.

The cutter head likewise is provided with substantially radial guideways 38, of which there are four shown (see Figures 9 and 10) within which are supported and guided positioning means consisting of the pins 35 which have formed upon them rack teeth, as indicated in Figures 9 and 10.

The tool carrier 32 is provided with a notch 36 (see Figures 7 and 8), and a spring pressed ball 37 carried by the head 3 is positioned to engage within the bottom of this notch 36, and thereby to retract the tool and tool carrier. However, a member which in the present form takes the shape of a rod 4, extends upwardly through the bore 10 of the boring bar and through the tube 39, and this rod is provided with a tapered or conical tip 43, which is engageable within the tapered hole 34, previously referred to. When so engaged, as seen in Figures 2 and 7, the tool 30 is projected, and the ball is displaced from the bottom of its notch 36. When the rod 4 is raised and the tapered tip 43 is disengaged from the hole 34, as seen in Figures 6 and 8, the ball 37, which has not been entirely displaced from the notch 36, now drops into the notch, and by this action causes a slight retraction of the tool carrier and tool.

By reason of the engagement of the fingers 71, previously referred to, with a collar 40 formed upon its upper end, the rod 4 is caused to move upward during retraction of the boring bar, and the tool 30 is retracted, since the fingers 71 are raised with the remainder of the yoke 7 to engage the clutch members 97 which effect raising of the boring bar, as has been previously described. The rod 4 is caused to move downward, upon release of the clutch members 97, under the influence of a spring 41, engaging a second collar 42, and when the rod is thus moved downward the clutch members 96 are engaged ready to accomplish slow advance or projection of the boring bar, and consequently the tool 30 is projected at such time.

Upon the lower end of the rod 4 there is also formed or there is secured a gear 44. This gear engages the rack teeth formed upon the centering members 35. Consequently, upon rotation of the rod 4, which may be accomplished by grasping its handle 45 which is outside the casing 10, the gear 44 can be rotated, and the centering members 35 can be moved inward or outward at any time. Also, by grasping the handle 45, the rod 4 can be moved upward or downward at any time, except as downward movement is restrained by the yoke 7 in the position of Figure 5.

It is essential that the boring bar thus constructed be maintained in a precise alignment, throughout the extent of its vertical movement, with its original position. This must be accomplished whether the boring bar is precisely accurate, as seen in Figure 11, whether there is a difference in diameter between its upper and its lower parts, as seen in Figure 12, occasioned by wear or by inaccuracy in manufacture, whether there is a worn portion immediately adjacent the bearings, and portions of larger diameter which must also at times enter the bearings, and whether the boring bar is of irregular surface, for instance, swelled between the bearings, as illustrated in Figure 14. Under all conditions the axis of the boring bar must remain precisely as it was originally fixed at the outset of the boring operation, and chatter must be prevented, yet the boring bar must be sufficiently free that it can move downward without meeting too great opposition, and it must be easily and freely moved upward, without any tendency to binding or other restriction.

To accomplish these ends I provide two bearings adjacent the upper and lower portions of the guide bracket 21, and consequently widely spaced apart. These are similar in form and in arrangement, and a description of one will suffice for both. Thus, the lower bearing comprises the outer ring 50 threaded at 51 into the bore of the guide bracket 21, and so that all parts may be tightly fitted and solidly supported from the bracket I prefer that the outer surface of the ring 50 be slightly tapered, as indicated at 52, to fit in a similarly tapered recess in the bracket. The inner surface of this ring is conically tapered, as is indicated at 53. This ring 50 may be omitted, and the latter taper, as indicated at 53', may be formed directly in the bracket itself, at the upper bearing.

Seated upon this latter tapered surface is an inner ring 5 which is arranged to expand and contract. For this purpose, as is customary, the ring may be split, and may be axially grooved or scored. Its outer surface is tapered conically complementally to the surface 53, and its inner surface is truly cylindrical and closely embraces the outer surface of the boring bar 1. The frictional engagement between the ring 5 and the boring bar 1 would ordinarily be sufficient to constrict the ring about the boring bar as the latter moves downwardly, but in order to insure this constriction, or at least such engagement with the bar as will induce it, I may provide a spring 54 bearing upon the top of the inner ring 5, and reacting against a ring 55 which is threaded within the upper end of the outer ring 50. Now frictional engagement between the outer surface of the boring bar 1 and the inner surface of the inner ring 5 will cause this ring to constrict and to slide downward slightly relative to the outer ring 50, because of the tapered surface 53, and by this constriction the boring bar will be rigidly held, yet free to move downward, but it cannot be displaced from its original axial alignment, nor will chatter be permitted. Upon moving upward, however, the constriction of the ring 5 is released, and the boring bar is free to move upward without undue wear or restraint.

Now as wear occurs in the surface of the boring bar, or as this surface is irregular from any other cause, the ring 5, which will yield yet which tends always to be constricted, will accommodate itself to these irregularities of surface, and yet at all times will hold the axis of the boring bar in true axial alignment with its original position.

It is necessary, in setting up the boring machine for work, to dispose it with the base frame 2 resting upon the top of a cylinder block, then to advance the boring bar slightly within a cylinder to be bored, so that the centering means 35 can be projected to engage the walls of this cylinder. Then when the boring bar has been properly positioned it must be held in this position by suitable positioning means, and these are generally indicated at 6 in Figure 1. These means are shown in greater detail in Figures 15 and 16, and are more fully disclosed and claimed in the second companion case, referred to above.

The positioning must be accurate so that the boring bar, in the position which it is caused to assume by the centering members 35, projected as seen in Figure 15, will take a uniform cut from all sides of the cylinder, and will not displace its final axis. Accordingly, I have devised the means which I shall describe, and which I prefer, though various positioning means may be employed.

These means, as herein shown, comprise a supporting member 60 between which and a plate 61 supported from the member 6 are pivotally supported wings or plates 62, preferably three in number. These wings are pivoted at 63, and may be swung outwardly to engage the side walls of a cylinder adjacent the cylinder to be bored. To swing the wings outwardly simultaneously I may provide them with helical cam members 64 disposed about the pivot axis 63 of the individual wings, and a nut 65, the outer surface of which is inclined complementally to the helices of the cams 64, and which is threaded upon a screw 66 journaled in the members 60 and 61, whereby upon rotation of the screw, the nut 65 being held by a pin 65' against rotation, the nut is moved downwardly, and by its engagement with the several cams 64, causes the wings 62 to swing outwardly. Each of these wings may be provided with a lug 69 at its lower end engageable beneath the lower edge of the cylinder to resist an upward pull, and a clamping screw 67, passing through a slot 26 in the base frame 2, is received in the member 60 or within an extension 68 thereof, which is threaded within the member 60 for adjustment of the effective length of the latter.

By these or like means the base frame, once centered, can be clamped and held definitely in position, and by the bearings described the boring bar will be held definitely and rigidly in position, so that when the cutting tool 30 is advanced toward the work it is assured that it will be positioned by the ball 37 at just the proper projection to take a minimum cut from the walls of the cylinder, yet to take this cut from all sides of the cylinder, to the end that the cylinder will be perfectly cylindrical throughout, yet will depart as slightly as possible from the original diameter, and from the previous axis.

What I claim as my invention is:

1. In a cylinder reboring machine, in combination, a base frame adapted to rest upon the top of a cylinder block to be bored, and including a guide bracket vertically disposed, a cylindrical boring bar received within said bracket and vertically movable therein, said bracket having a pair of vertically spaced bearing surfaces surrounding the boring bar and each inclined steeply relative to and inwardly and downwardly toward the latter's axis, and a readily contractible and expansible split ring cooperating with each bearing surface, each ring having an outer surface complementally inclined to and seating upon its related bearing surface, and further having an inner surface closely embracing the boring bar, whereby downward movement of the boring bar frictionally constricts the rings to cause them to press inward substantially equally from all sides against the boring bar, to maintain the latter in precise alignment with the axis of the cylinder being bored during advance of the boring bar, and whereby upward movement of the boring bar frees the boring bar from such constriction.

2. A cylinder reboring machine as set forth in claim 1 including spring means continually urging the split rings downward into close embrace of the boring bar.

3. In combination with an axially bored boring bar, a rotary cutter head supported at the lower end thereof, and having a plurality of substantially radial guide ways, centering rods received in certain of said guide ways and having rack teeth thereon, a cutting tool received in another of said guide ways, means tending to retract said tool, a rod extending through the axial bore and having a gear upon its lower end engageable with said rack teeth to effect movement of the centering means upon rotation of the rod, a tapered tip upon the rod, said tool having a hole engageable by said tapered tip, thereby to effect movement of the cutting tool under the influence of said tapered tip, by longitudinal movement of the rod.

4. In a cylinder reboring machine, a boring bar, a rotatable cutter head carried thereby, a projectable and retractable cutting tool carried by said cutter head, power means, means including a manually operable element clutch movable between two positions to selectively establish bar projecting and bar retracting driving connections between the power means and the bar, and means directly operable by shifting movement of said manually operable clutch element to bar projecting position to project the tool and by shifting movement of said clutch element to bar retracting position to retract said tool.

5. In a cylinder reboring machine, a boring bar, a rotatable cutter head carried thereby, a projectable and retractable cutting tool carried by said cutter head, power means, means including a manually operable clutch element movable between two positions to selectively establish bar projecting and bar retracting driving connections between the power means and the bar, means tending constantly to retract the cutting tool, and means directly operable by shifting movement of said manually operable clutch element to boring bar projecting position to positively project the tool, and by shifting movement of said manually operable clutch element to boring bar retracting position to release said tool for retraction by said retracting means.

6. In a cylinder reboring machine, a boring bar, a rotatable cutter head carried thereby, a projectable and retractable cutting tool carried by said cutter head, power means, means including a clutch movable between two positions to selectively establish bar projecting and bar retracting driving connections between said power means and said bar, a manually operable clutch actuator movable between two positions to move said clutch to its two positions, respectively, and means directly operable by actuation of said clutch actuator and clutch to bar projecting position to project said tool, and by actuation of said clutch actuator and clutch to bar retracting position to retract said tool.

7. In a cylinder reboring machine, a projectable and retractable boring bar, a rotatable cutter head carried thereby, power means, means including a clutch movable between two positions to selectively establish bar projecting and bar retracting driving connections between said power means and said bar, a manually operable clutch actuator movable between two positions to move said clutch to its two positions, respectively, a shaft extending through said boring bar and movable between projected and retracted positions relative thereto responsive to movement of said clutch actuator and clutch to bar projecting and bar retracting positions, respectively, a projectable and retractable cutting tool carried by the cutter head, means directly operable by projection of said shaft to project said tool and by retraction of said shaft to release said tool for retraction, and means operating upon release of said tool to retract the same.

8. In a cylinder reboring machine, a boring bar, a rotary cutter head carried thereby, a cutter head centering element and a cutting tool element both carried by said cutter head and projectable and retractable relative thereto, a rotatably and longitudinally movable common operator for controlling said elements independently of each other, means operable by rotation of said operator to project one of said elements, and means operable by longitudinal movement of said actuator to project the other of said elements.

9. In a cylinder reboring machine, a boring bar, a rotary cutter head carried thereby, a cutter head centering element and a cutting tool element both carried by said cutter head and projectable and retractable relative thereto, a rotatably and longitudinally movable common operator for controlling said elements independently of each other, means responsive to rotation of said operator to control projection and retraction of one of said elements, and means responsive to longitudinal movement of said operator to control projection and retraction of the other of said elements.

10. In a cylinder reboring machine, a boring bar, a rotary cutter head carried thereby, a cutter head centering element and a cutting tool both carried by said cutter head and projectable and retractable relative thereto, a rotatably and longitudinally movable operator having a gear connection with the centering element for projecting and retracting the latter by rotation of the operator, and having wedging cooperation with said cutting tool for projecting the latter by longitudinal movement of the operator in one direction, and means to retract the tool upon longitudinal movement of the operator in the opposite direction.

11. In a cylinder reboring machine, a boring bar, a rotary cutter head carried thereby, a cutter head centering element and a cutting tool element both carried by said cutter head and projectable and retractable relative thereto, a rotatably and longitudinally movable shaft operatively connected with one of said elements for projecting and retracting the same by rotation of said shaft in opposite directions, respectively, and means operable in response to longitudinal movements of said shaft in opposite directions, respectively, to project and retract the other of said elements.

12. In a cylinder reboring machine, a longitudinally projectable and retractable boring bar, a rotary cutter head carried thereby, a tool holder removably mounted in the cutter head and projectable and retractable relative thereto laterally relative to the boring bar, a cutting tool mounted on said holder for adjustment relative thereto, means to secure the tool in adjusted position relative to the holder, means tending constantly, when the holder is placed in the cutter head, to move the holder to and to retain it in a retracted position in which the tool is retracted from its cutting position, and means carried by the boring bar for cooperation with the tool holder to project and to releasably hold the latter in a single definite predetermined position relative to the cutter head, thereby to project the tool to and to releasably hold it in cutting position as predetermined by adjustment of the tool relative to the holder.

13. The combination as set forth in claim 12 in which the tool holder projecting and holding means comprises a shaft extending through the boring bar, and in which the tool holder and said shaft are provided with cooperating formations effective upon longitudinal movement of the shaft in one direction to project the holder to its predetermined position and effective upon opposite longitudinal movement of said shaft to release the holder for retraction.

14. In a cylinder reboring machine, a tool driving element, a tool holder removably mounted in said driving element and projectable and retractable relative thereto, a cutting tool, means adjustably securing said tool to said holder, a member guided by said driving element for movement into engagement with the holder to hold the latter definitely fixed relative to the driving element in a predetermined projected position, and means to retract the holder upon holder-releasing movement of said member.

15. The combination as set forth in claim 14 in which the tool holder has a tapered socket and in which the tool holder holding member comprises a tapered pin to enter said socket.

CLARENCE T. ROTTLER.